United States Patent
Park et al.

(10) Patent No.: US 9,860,358 B2
(45) Date of Patent: Jan. 2, 2018

(54) APPARATUS AND METHOD FOR SHARING ENERGY IN WIRELESS DEVICE

(75) Inventors: Tae Rim Park, Seoul (KR); Tae Seok Kim, Hwaseong-si (KR); Ui Kun Kwon, Hwaseong-si (KR); Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1081 days.

(21) Appl. No.: 13/589,477

(22) Filed: Aug. 20, 2012

(65) Prior Publication Data
US 2013/0043738 A1     Feb. 21, 2013

(30) Foreign Application Priority Data
Aug. 18, 2011   (KR) .................... 10-2011-0082374

(51) Int. Cl.
   *H02J 50/00*   (2016.01)
   *H04M 1/725*   (2006.01)
   *H02J 5/00*    (2016.01)
   *H02J 7/02*    (2016.01)
   *H02J 17/00*   (2006.01)
   *B60L 11/18*   (2006.01)
   *H04W 52/02*   (2009.01)

(52) U.S. Cl.
   CPC ......... *H04M 1/7253* (2013.01); *B60L 11/182* (2013.01); *B60L 11/1838* (2013.01); *H02J 5/005* (2013.01); *H02J 7/025* (2013.01); *H02J 17/00* (2013.01); *H04W 52/0261* (2013.01)

(58) Field of Classification Search
   CPC .......... H02J 50/00; H02J 5/005; H04B 5/0037
   USPC ........... 307/104; 455/452.2, 11.1, 13.1, 13.4; 370/274; 375/211
   See application file for complete search history.

(56) References Cited

U.S. PATENT DOCUMENTS

| | | | |
|---|---|---|---|
| 2006/0158152 A1 | 7/2006 | Taniguchi et al. | |
| 2009/0140692 A1 | 6/2009 | Hwang | |
| 2010/0033021 A1* | 2/2010 | Bennett | 307/104 |
| 2011/0115923 A1 | 5/2011 | Moritomo | |
| 2013/0026981 A1* | 1/2013 | Van Der Lee | 320/108 |

FOREIGN PATENT DOCUMENTS

| | | |
|---|---|---|
| JP | 2008-312294 A | 12/2008 |
| JP | 2010-268610 A | 11/2010 |

OTHER PUBLICATIONS

Extended European Search Report issued on Aug. 14, 2015 in counterpart European Application No. 12181033.7 (5 pages in English).
Office Action issued by the European Patent Office on Oct. 24, 2016 in corresponding EP Patent Application No. 12181033.7.
Korean Office Action dated Oct. 30, 2017, in corresponding Korean Application No. 10-2011-0082374 (8 pages in English, 8 pages in Korean).

* cited by examiner

*Primary Examiner* — Daniel Kessie
(74) *Attorney, Agent, or Firm* — NSIP Law

(57) ABSTRACT

A method and apparatus to share energy in a wireless device are provided. A power sharing method between a wireless device and at least one neighboring wireless device, includes scanning, by the wireless device, the at least one neighboring wireless device. The power sharing method further includes determining to share power with the at least one neighboring wireless device. The power sharing method further includes sharing power with the at least one neighboring wireless device.

23 Claims, 11 Drawing Sheets

APPARATUS AND METHOD FOR SHARING ENERGY IN WIRELESS DEVICE

CROSS-REFERENCE TO RELATED APPLICATION(S)

This application claims the benefit under 35 U.S.C. §119(a) of Korean Patent Application No. 10-2011-0082374, filed on Aug. 18, 2011, in the Korean Intellectual Property Office, the entire disclosure of which is incorporated herein by reference for all purposes.

BACKGROUND

1. Field

The following description relates to a method and apparatus to share energy in a wireless device.

2. Description of Related Art

The use of various types of portable wireless devices, such as smartphones, tablet personal computers (PCs), netbooks, and the like, has increased. Additionally, communication standards between portable wireless devices, such as near field communication (NFC), wireless local area network (WLAN), Bluetooth, and the like, have been developed. Accordingly, information may be exchanged between portable wireless devices used by the same user or different users, and these portable wireless devices may form a single application and may be operated as a single system.

When portable wireless devices are operated as a single system, there may be a limitation on a service time or lifetime of an application due to a lack of battery power to operate the portable wireless devices. Furthermore, the lack of battery power may occur in a wireless device that requires a continuous operation, for example, in a sensor device for healthcare.

SUMMARY

In one general aspect, there is provided a power sharing method between a wireless device and at least one neighboring wireless device, including scanning, by the wireless device, the at least one neighboring wireless device. The power sharing method further includes determining to share power with the at least one neighboring wireless device. The power sharing method further includes sharing power with the at least one neighboring wireless device.

The power sharing method further includes receiving, from the at least one neighboring wireless device, a descriptor of the at least one neighboring wireless device.

The descriptor of the at least one neighboring wireless device includes an identification (ID) of the at least one neighboring wireless device, or information associated with a battery of the at least one neighboring wireless device, or a priority level of the at least one neighboring wireless device, or information regarding whether the at least one neighboring wireless device is capable of transmitting and/or receiving power, or a role of the at least one neighboring wireless device, or a cooperativeness of the at least one neighboring wireless device, or any combination thereof.

The power sharing method further includes generating a neighbor table based on the descriptor of the at least one neighboring wireless device.

The generating of the neighbor table includes adding, to the descriptor of the at least one neighboring wireless device, information on a strength of a signal received from the at least one neighboring wireless device, and information on an amount of time elapsed after the descriptor of the at least one neighboring wireless device is received.

The power sharing method further includes determining whether it is necessary to immediately share power between the wireless device and the at least one neighboring wireless device.

The determining whether it is necessary to immediately share power includes checking a battery level and a lifetime of each of the wireless device and the at least one neighboring wireless device, the battery level and the lifetime of the wireless device being included in a descriptor of the wireless device, and the battery level and the lifetime of the at least one neighboring wireless device being included in the descriptor of the at least one neighboring wireless device. The determining further includes computing a difference in the battery level, or a difference in the lifetime, between the wireless device and the at least one neighboring wireless device based on a result of the checking. The determining further includes determining whether it is necessary to immediately share the power between the wireless device and the at least one neighboring wireless device based on whether the difference in the battery level, or the difference in the lifetime, corresponds to a predetermined threshold.

The power sharing method further includes generating a descriptor of the wireless device. The descriptor of the wireless device includes an ID of the wireless device, or information associated with a battery of the wireless device, or a priority level of the wireless device, or information regarding whether the wireless device is capable of transmitting and/or receiving power, or a role of the wireless device, of a cooperativeness of the wireless device, or any combination thereof.

The power sharing method further includes determining a role of the wireless device, as either a power supplier or a power consumer, based on a designation by a user of the wireless device, or a descriptor of the wireless device, or a predetermined rule, or any combination thereof.

The predetermined rule determines, as the power supplier, a device with a longest lifetime, and/or a device connected to a power supply, among the wireless device and the at least one neighboring wireless device.

The power sharing method further includes changing the role of the wireless device.

The changing includes changing the role of the wireless device based on the designation by the user of the wireless device, and/or a descriptor of the at least one neighboring wireless device that is received from the at least one neighboring wireless device.

The power sharing method further includes determining a power transmission scheme to share power between the wireless device and the at least one neighboring wireless device. The sharing of the power is based on the power transmission scheme. The determining of the power transmission scheme includes determining whether at least two power suppliers exist among the at least one neighboring wireless device. The determining further includes determining the power transmission scheme so that each of the at least two power suppliers changes an power transmission channel and an power transmission time, and independently transmits power, or so that the at least two power suppliers cooperate with each other and simultaneously transmit the power, when it is determined that the at least two power suppliers exist.

The power sharing method further includes determining a power transmission scheme to share power between the wireless device and the at least one neighboring wireless device. The sharing of the power is based on the power transmission scheme. The determining of the power transmission scheme includes determining whether at least two power consumers exist among the at least one neighboring wireless device. The determining further includes determining the power transmission scheme so that power is transmitted by assigning different frequencies or different time slots to each of the at least two power consumers, when it is determined that the at least two power consumers exist.

The sharing of the power includes adjusting a strength of a signal transmitted by the wireless device, or a time required to transmit the signal, or a value used to perform impedance matching between the wireless device and the at least one neighboring wireless device, or any combination thereof.

The power sharing method further includes determining whether a preset condition to interrupt the sharing of the power occurs while the power is shared with the at least one neighboring wireless device.

The preset condition occurs when a difference in a battery level, or a difference in a lifetime, between the wireless device and the at least one neighboring wireless device is less than a predetermined threshold.

The power sharing method further includes determining whether a number of the at least one neighboring wireless device is changed.

The determining to share the power includes determining whether to share the power with the at least one neighboring wireless device based on a designation by a user of the wireless device, and/or an alarm based on a change in a descriptor of the wireless device.

A non-transitory computer-readable recording medium stores a program including instructions to cause a computer to implement the power sharing method.

In another general aspect, there is provided a power sharing apparatus of a wireless device, including a scanning unit configured to scan at least one neighboring wireless device. The power sharing apparatus further includes a determining unit configured to determine to share power with the at least one neighboring wireless device. The power sharing apparatus further includes a sharing unit configured to share power with the at least one neighboring wireless device.

The power sharing apparatus further includes a transmission scheme determining unit configured to determine an power transmission scheme to share power between the wireless device and the at least one neighboring wireless device. The sharing unit is further configured to share the power with the at least one neighboring wireless device based on the power transmission scheme.

The power sharing apparatus further includes a transceiving unit configured to transmit, to the at least one neighboring wireless device, data and/or the power. The transceiving unit is further configured to receive, from the at least one neighboring wireless device, the data and/or the power.

In still another general aspect, there is provided a power sharing apparatus of an electric vehicle, including a processor configured to scan at least one neighboring electric vehicle. The processor is further configured to determine to share power with the at least one neighboring electric vehicle. The processor is further configured to share power with the at least one neighboring electric vehicle.

The processor is further configured to determine a role of the electric vehicle, as either a power supplier or a power consumer, based on a designation by a user of the electric vehicle, or a descriptor of the electric vehicle, or a predetermined rule, or any combination thereof. The processor is further configured to share power with the at least one neighboring electric vehicle based on the role of the electric vehicle.

Other features and aspects may be apparent from the following detailed description, the drawings, and the claims.

Figure 1:
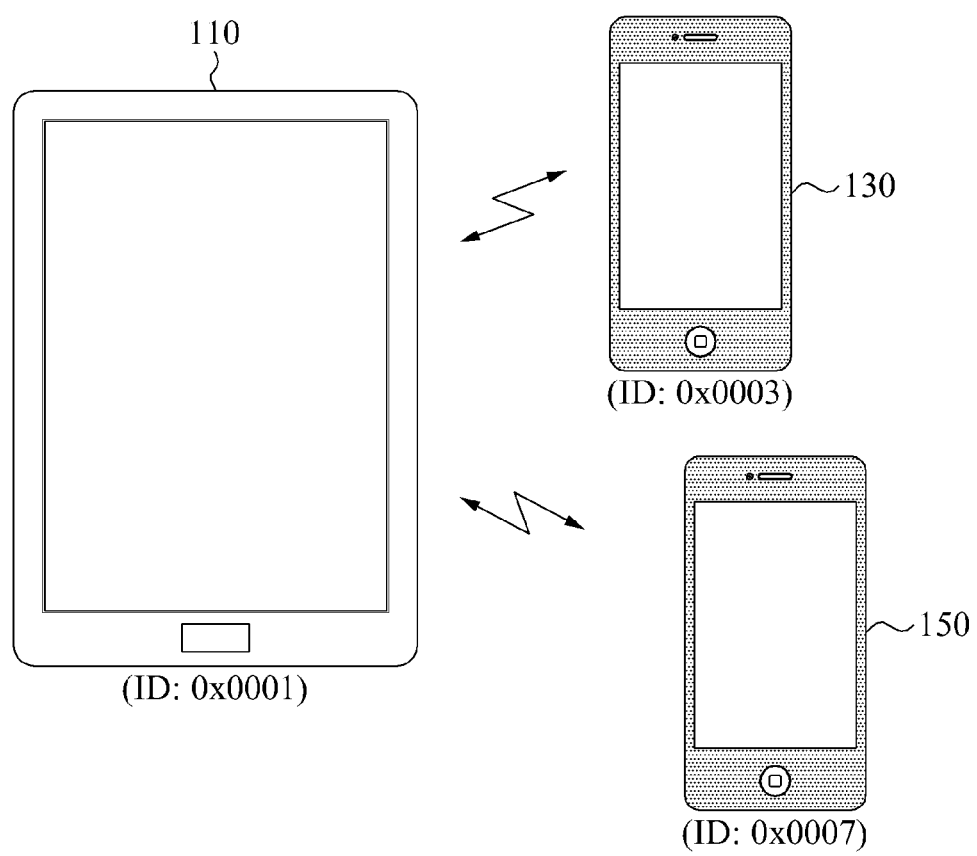
FIG. 1 is a diagram illustrating an example of sharing energy between wireless devices.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of sharing energy between wireless devices. Wireless devices or neighboring devices may share energy, and may include, for example, tablet personal computers (PCs), smartphones, sensor devices, digital cameras, netbooks, and/or the like. The wireless devices or the neighboring devices may receive power from a power supply, such as, for example, a battery, a power source cable, and/or a power source generator, during execution of an application. Additionally, the neighboring devices may wirelessly share data or energy with each other and/or other wireless devices, within a wireless transmission range of the neighboring devices. Hereinafter, the term "device" may be used to refer to both a wireless device and a neighboring device.

For example, in an environment including a tablet PC 110 and a first smartphone 130, a second smartphone 150 is newly-added. The tablet PC 110, the first smartphone 130, and the second smartphone 150 simultaneously transmit data and energy with each other. Additionally, the tablet PC 110 has an identification (ID) of '0x0001', the first smartphone 130 has an ID of '0x0003', and the second smartphone 150 has an ID of '0x0007'.

In this example, the second smartphone 150 receives, from the tablet PC 110 and the first smartphone 130, a descriptor of the tablet PC 110 and a descriptor of the first smartphone 130, respectively, using a passive scanning scheme of turning on a circuit or a module that is used to transmit power. A descriptor describes information used to share energy between devices. The descriptor may include, for example, an ID of a device, information associated with a battery of the device, a priority level of the device, information regarding whether the device is capable of transmitting and/or receiving energy, a role of the device, and/or a cooperativeness of the device. For example, the role of the device may refer to a current role of the device, e.g., as a server, an energy transmitter, an energy receiver, and/or the like.

Devices may exchange descriptors of the devices, and may analyze information used to share energy between the devices. The information used to share energy may include, for example, information on how much battery power of a corresponding device remains, information on whether the corresponding device is capable of receiving and/or transmitting energy, and/or the like. Each device may generate a neighbor table based on descriptors of neighboring devices that are received from the neighboring devices.

Additionally, a user of the second smartphone 150 executes an application program, and applies for participation in an application program that is being used by the tablet PC 110 and the first smartphone 130. When existing users, namely, a user of the tablet PC 110 and a user of the first smartphone 130, allow participation of the user of the second smartphone 150, the second smartphone 150 executes a configuration program. The second smartphone 150 also requests the user of the second smartphone 150 to agree on whether to share energy with the tablet PC 110 and the first smartphone 130. When the user of the second smartphone 150 agrees to share energy, the second smartphone 150 changes a state of the second smartphone 150, e.g., changes a value of cooperativeness included in a descriptor of the second smartphone 150 to 'True', and shares energy with the tablet PC 110 and the first smartphone 130 to maximize a service time of the application program.

One of devices (e.g., the second smartphone 150) may perform an energy sharing method to determine a role of each device based on a command received directly from a user, and to immediately share energy between the devices. In this example, the devices are sufficiently close to each other in proximity, and the user has advance information associated with a necessity for his or her device to share energy and with an effect of sharing the energy. When energy sharing starts, when charging of a battery of an energy consumer is completed, and/or when a battery level exceeds a predetermined threshold, the energy consumer may terminate receiving of power, or may transmit, to an energy supplier, a message to request interruption of energy supply.

Additionally, the energy supplier may check a battery capacity of the energy consumer by periodically or aperiodically receiving a message regarding a state of the energy consumer, and may interrupt energy supply without a request from the energy consumer. The energy consumer may refer to a device configured to receive energy, for example, power, and the energy supplier may refer to a device configured to supply energy.

Devices participating in energy sharing may periodically share information on a lifetime of a battery of each of the devices. For example, when a lifetime of a device among the devices drops below a predetermined threshold, or when a difference in lifetime between devices exceeds a predetermined threshold, a device expected to have a longest lifetime may be set as an energy supplier, and a device expected to have a shortest lifetime may be set as an energy consumer, so that energy may be shared appropriately.

For example, a battery of the second smartphone 150 has a current lifetime of 1 hour, and requires a minimum lifetime of 2 hours to smoothly operate the second smartphone 150. In this example, when a battery of the tablet PC 110 has a current lifetime of 9 hours, the tablet PC 110 functions as an energy supplier that transmits power to the second smartphone 150, which functions as an energy consumer. Subsequently, when a difference in lifetime between the tablet PC 110 and the second smartphone 150 drops below a predetermined threshold, for example, 2 hours, the tablet PC 110 interrupts power transmission. The lifetime values described above are merely examples, and other lifetime values may be used depending on the situation.

Each of the devices participating in energy sharing may adjust a strength of a signal (or a pulse amplitude) during transmission and/or reception of power, a time required to transmit the signal (or a pulse position), and/or a value used to perform impedance matching between the devices. These values may be adjusted using a circuit or a module that is used to transmit power. Further, each of the devices participating in energy sharing may exchange data via a separate communication module and/or the like that is included in each of the devices.

An energy sharing environment in which energy is shared between devices may include at least one energy supplier configured to transmit power, and at least one energy consumer configured to receive power, as shown in FIG. 1. In an example in which a device is capable of either transmitting or receiving power, a role of the device may be fixed as either an energy supplier or an energy consumer. In another example in which a device is capable of both transmitting and receiving power, a role of the device may be changed automatically, rather than being fixed, based on a change in user settings, and/or a change in condition, such as, for example, a battery level, a lifetime, and/or the like.

Power may be wirelessly transmitted to a device that requires energy, among devices operated by at least one battery, so that energy may be shared. Thus, a service time of an application program executed between the devices, or a lifetime of a predetermined device, may be maximized.

Device may perform other energy sharing methods to search for neighboring devices through scanning, and to share energy between the devices based on a user command and/or a predetermined rule. Examples of a method of sharing energy through scanning will be described with reference to FIGS. 2 and 3.

Figure 2:
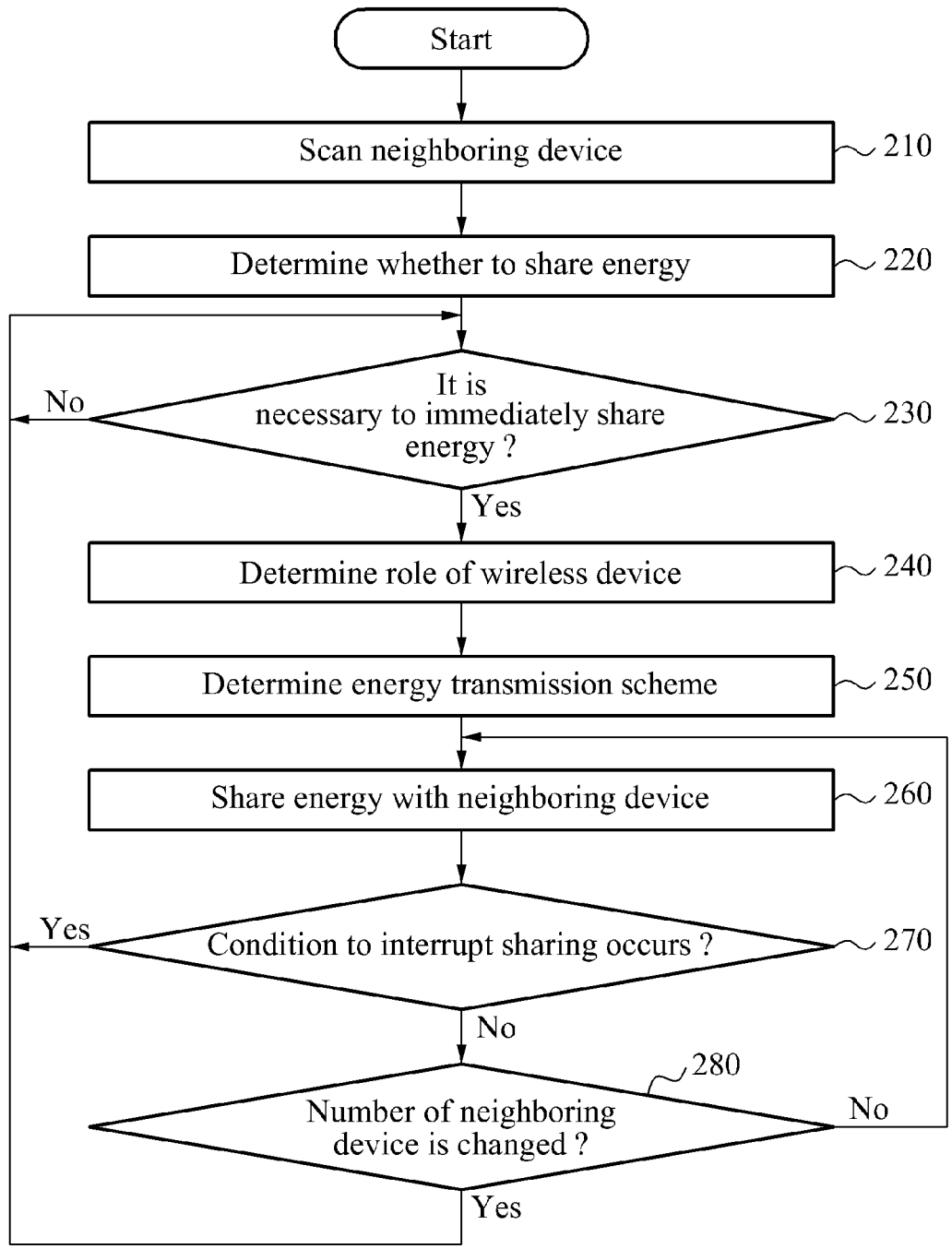
FIG. 2 is a flowchart illustrating an example of an energy sharing method of a wireless device.

FIG. 2 illustrates an example of an energy sharing method of a wireless device. At step 210, the wireless device scans at least one neighboring device. The wireless device may use Wi-Fi, Bluetooth, a circuit or a module that is configured to wirelessly transmit power, and/or the like. The neighboring device is configured to wirelessly share data and/or energy with the wireless device. The wireless device and the neighboring device may each include a circuit or a module that is configured to wirelessly transmit and/or receiver power, using various schemes, for example, an inductive coupling scheme, a resonance coupling scheme, a resonator isolation scheme, and/or the like.

At step 220, the wireless device determines whether to share energy with the neighboring device. For example, the wireless device may determine whether to share energy with the neighboring device based on a designation by a user of the wireless device, and/or an alarm based on a change in a descriptor of the wireless device. The change in the descriptor of the wireless device indicates a change in information associated with a battery of the wireless device, for example, a power source, a battery level, a lifetime, and/or the like. In this example, when the battery level of the wireless device approaches a predetermined level, e.g., a minimum capacity of the battery that is required for a normal operation of the wireless device, an alarm may ring. When the alarm rings, the wireless device, or the user of the wireless device, may set the wireless device to share energy with the neighboring device.

At step 230, the wireless device determines whether it is necessary to immediately share energy between the wireless device and the neighboring device. For example, the wireless device checks a battery level and a lifetime that are included in each of the descriptor of the wireless device and a descriptor of the neighboring device. Based on a result of the checking, the wireless device computes a difference in the battery level, or a difference in the lifetime, between the wireless device and the neighboring device. The wireless device determines whether it is necessary to immediately share energy, depending on whether the difference in the battery level, or the difference in the lifetime, corresponds to (e.g., is greater than or equal to) a predetermined threshold. When it is necessary to immediately share energy, the method continues to step 240. Otherwise, the method repeats step 230.

At step 240, the wireless device determines a role of the wireless device, between the wireless device and the neighboring device. The role of the wireless device is determined to be either an energy supplier or an energy consumer, and a role of the neighboring device may also be determined together with the role of the wireless device. However, the role of the neighboring device may not necessarily be opposed to the role of the wireless device. In an example in which the wireless device functions as an energy supplier, the neighboring device may function as an energy consumer or an energy supplier. In another example in which a plurality of neighboring devices exist, a neighboring device among the neighboring devices may function as an energy supplier, and another neighboring device among the neighboring devices may function as an energy consumer.

In more detail, the wireless device determines the role of the wireless device, based on the designation by the user of the wireless device, the descriptor of the wireless device, and/or a predetermined rule. For example, a priority level or a power source in the descriptor of the wireless device may be used to determine the role of the wireless device. When the wireless device is of a high priority level, the wireless device may determine itself to be an energy consumer, and when the wireless device is of a low priority level, the wireless device may determine itself to be an energy supplier. Additionally, when the wireless device includes a power supply as a power source, the wireless device may determine itself to be an energy supplier, and when the wireless device includes a battery as a power source, the wireless device may determine itself to be an energy consumer. Furthermore, other elements in the descriptor of the wireless device may also be used to determine the role of the wireless device. The predetermined rule may be set to determine, as an energy supplier, a device with a longest lifetime, or a device connected to a power supply, among the wireless device and the neighboring device.

The wireless device may change the determined role of the wireless device. For example, each of roles of devices used to share energy may not necessarily be fixed to a single role, and may be changed adaptively based on a change in surroundings or environment, a change in time, and/or the like. In an example in which a new neighboring device enters an environment including the wireless device and two neighboring devices, even when the wireless device has functioned as an energy supplier, the new neighboring device may function as the energy supplier, and the wireless device may function as an energy consumer.

Additionally, the wireless device may change the determined role of the wireless device based on the designation by the user of the wireless device and/or based on the descriptor of the neighboring device. The descriptor of the neighboring device may be received from the neighboring device.

At step 250, the wireless device determines an energy transmission scheme to share energy between an energy supplier and an energy consumer. The wireless device may transmit energy using various energy transmission schemes based on a number of energy suppliers or a number of energy consumers, which will be further described with reference to FIG. 3.

At step 260, the wireless device shares energy with the neighboring device based on the energy transmission scheme. To share the energy with the neighboring device, the wireless device may transmit and receive power to and from the neighboring device, using various schemes, for example, the inductive coupling scheme, the resonance coupling scheme, the resonator isolation scheme, and/or the like. Additionally, to share the energy with the neighboring device, the wireless device may adjust a strength of a signal transmitted by the wireless device, a time required to transmit the signal, and/or a value used to perform impedance matching between the wireless device and the neighboring device, based on the energy transmission scheme.

At step 270, the wireless device determines whether a preset condition to interrupt the energy sharing occurs while the energy is being shared with the neighboring device. The preset condition may occur when the difference in the battery level or the difference in the lifetime between the wireless device and the neighboring device is less than the predetermined threshold. When the preset condition occurs, the wireless device performs step 230 again. When the preset condition does not occur, the wireless device performs step 280.

At step 280, the wireless device determines whether a number of the at least one neighboring device is changed. For example, when a new neighboring device is added to an energy sharing environment, or when one of the at least one neighboring device moves further than a predetermined distance from the wireless device, e.g., out of the energy sharing environment, the wireless device determines that the number of the at least one neighboring device is changed. When the number of the at least one neighboring device is changed, the wireless device performs step 230 again. When there is no change in the number of the at least one neighboring device, the wireless device continues to share the energy with the neighboring device in step 260.

Figure 3:
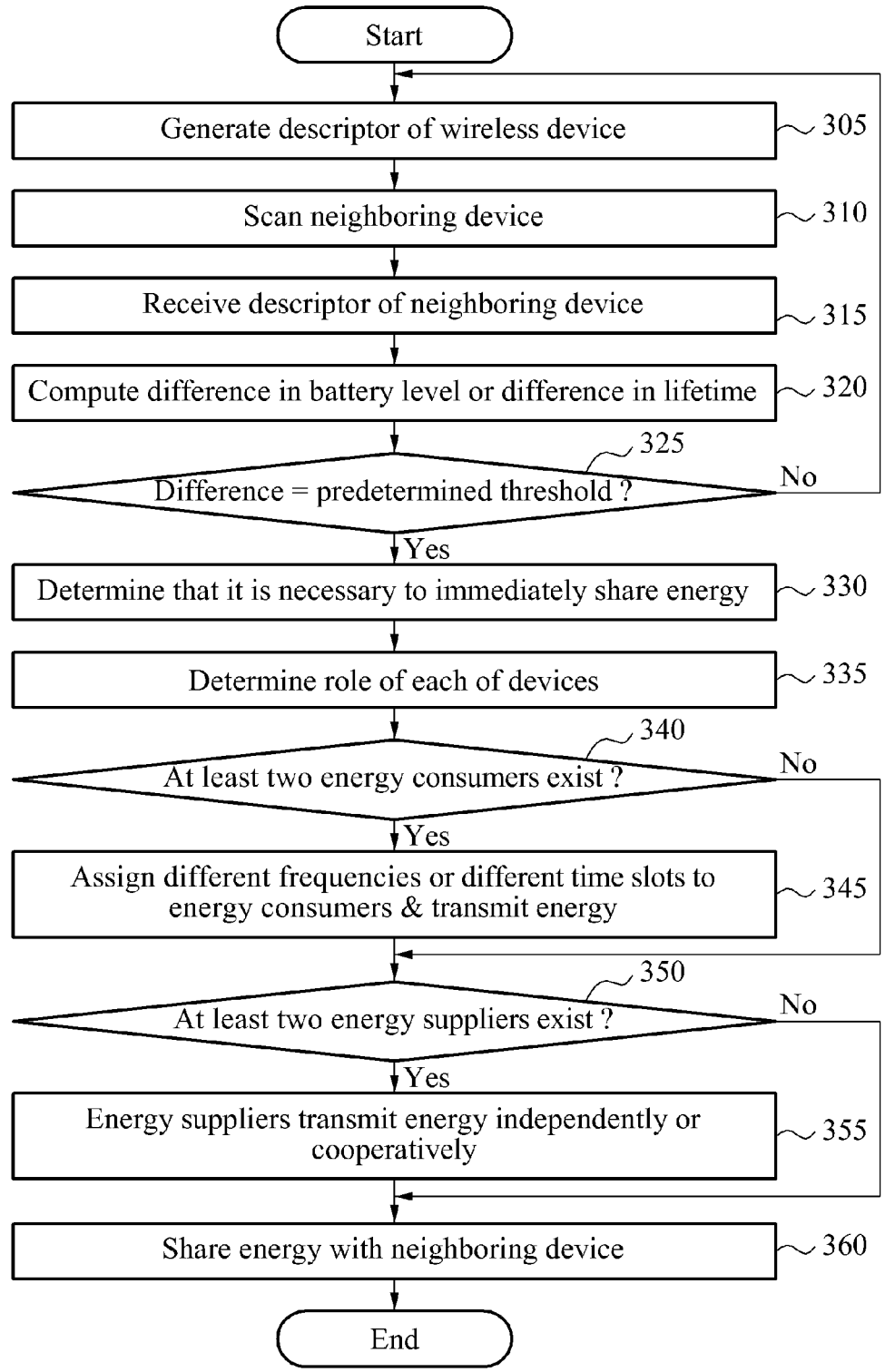
FIG. 3 is a flowchart illustrating another example of an energy sharing method of a wireless device.

FIG. 3 illustrates another example of an energy sharing method of a wireless device. At step 305, the wireless device generates a descriptor of the wireless device.

At step 310, the wireless device scans at least one neighboring device. The neighboring device is configured to wirelessly share data and/or energy with the wireless device. The wireless device may scan the neighboring device using an active scanning scheme and/or a passive scanning scheme.

In the active scanning scheme, the wireless device actively requests a response from the neighboring device, and scans the neighboring device. In the passive scanning scheme, the wireless device periodically receives a message from the neighboring device for a predetermined period of time, and scans the neighboring device.

At step 315, the wireless device receives, from the neighboring device, a descriptor of the neighboring device. Devices generate descriptors of the devices based on information regarding the devices, prior to the scanning, and exchange the generated descriptors with each other, on-demand or periodically. The generated descriptors may be exchanged along with the messages of the active scanning scheme and/or the passive scanning scheme.

Each of the descriptors may include, for example, an ID of a corresponding device, information associated with a battery of the device, a priority level of the device, a capability indicating whether the device is capable of transmitting and/or receiving energy, a current role of the device, a cooperativeness of the device, and/or the like. The information associated with the battery may include, for example, a power source, a battery level, and/or an expected lifetime.

Additionally, the wireless device or the neighboring device may process the exchanged descriptors, and may generate a neighbor table. For example, when the descriptor of the at neighboring device is received, the wireless device may add, to the descriptor of the neighboring device, information on a strength of a signal received from the neighboring device, and information on an amount of time elapsed after the descriptor of the neighboring device is received. The wireless device may generate the neighbor table to include the descriptor of the neighboring device with this additional information.

The information on the strength of the received signal may include, for example, a Received Signal Strength Indication (RSSI). Additionally, the information on the amount of the time elapsed may be represented by, for example, a freshness based on an information reception time.

Table 1 illustrates an example of a neighbor table. Values described below are merely examples, and other values may be used depending on the situation.

In Table 1, the ID indicates information used to identify devices, and may include, for example, a value of 16 bits assigned in advance, or an Institute of Electrical and Electronics Engineers (IEEE) address of 6 bytes assigned in advance. A local address may be assigned in a similar manner as an assignment of an Internet Protocol (IP) address by a Dynamic Host Configuration Protocol (DHCP), and may also be used as the ID.

The RSSI indicates a signal strength in dBm of a device that is received by another device, and may be a value obtained by adding a predetermined value as an offset to the strength of the received signal. The power source in the information associated with the battery indicates whether a device is currently operated depending on a battery, or receives power supplied from a power supply. For example, when a device among the wireless device and the neighboring device is being operated by a power supply, the device may function as an energy supplier preferentially.

The battery level indicates a value that represents a currently available battery capacity by '%' with respect to a fully charged battery capacity. Additionally, the lifetime indicates an operation time expected based on a remaining battery capacity, a currently-used battery capacity, and/or the like.

The priority level indicates a preference selected by a user, and may be assigned based on a characteristic of a device. When there is no separate user input designating an energy sharing of a device, the priority level may be used to determine a priority for energy supply, namely, power transmission. For example, a Personal Multimedia Player (PMP) and a smartphone may be wireless devices that desire to share energy. In this example, a high priority level may be assigned to the smartphone to mainly use the smartphone as an energy consumer. When a battery level of the smartphone falls below a predetermined level, the smartphone may generate an alarm or transmit a message to a user via a User Interface (UI) and/or the like, based on the high priority level. Additionally, the PMP may automatically transmit power of the PMP to the smartphone, so that the power may be supplied to the battery of the smartphone based on the high priority level.

The capability indicates whether a wireless device is capable of transmitting and/or receiving energy, for example, power. The current role indicates whether a device currently functions as an energy supplier or as an energy consumer, or indicates a state in which no role is assigned.

The cooperativeness indicates whether a device participates in sharing of energy, namely, energy supply, through power transmission, or participates in receiving of energy. In an example, when a device participates in only sharing of energy, the cooperativeness may be set to 'True'. In another example, when a device participates in only receiving of energy, the cooperativeness may be set to 'False'. Since the cooperativeness of each device in Table 1 is set to 'True', both of the devices function as energy suppliers to share energy.

TABLE 1

| ID | RSSI | Power source | Battery level (%) | Lifetime (hours) | Priority level | Capability | Current role | Cooperativeness | Freshness |
|---|---|---|---|---|---|---|---|---|---|
| 0x0001 | 20 | Battery | 50 | 9 | 2 | TRX | Supplier | True | 3 |
| 0x0003 | 30 | Battery | 70 | 7 | 2 | TRX | Consumer | True | 10 |

The freshness indicates how much time has elapsed after a descriptor of a corresponding device is received. Each device may increase a count value, for example, every time a predetermined period of time elapses after a descriptor of the corresponding device is received. For example, when a new descriptor is received, the freshness may indicate an amount of time elapsed after the new descriptor is received, by resetting the count value.

For example, when a user requests to share energy between the wireless device and a neighboring device scanned by the wireless device, the wireless device determines whether it is necessary to immediately share energy between the wireless device and the neighboring device. In this example, the user may instruct, via a UI, the wireless device to simultaneously perform sharing of energy and scanning of a neighboring device.

To determine whether it is necessary to immediately share the energy, the wireless device checks a battery level and a lifetime of the wireless device and the neighboring device. At step 320, the wireless device computes a difference in the battery level or a difference in the lifetime between the wireless device and the neighboring device. The battery level and the lifetime may be included in each of the descriptor of the wireless device and the descriptor of the neighboring device.

At step 325, the wireless device determines whether the difference in the battery level or the difference in the lifetime corresponds to (e.g., is greater than or equal to) a predetermined threshold. When the difference in the battery level or the difference in the lifetime corresponds to the predetermined threshold, the wireless device performs the step 330. Otherwise, the wireless device performs the step 305 again.

In more detail, when the difference in the battery level or the difference in the lifetime is less than the predetermined threshold, the wireless device examines a new result of the determining in step 325 based on a change in the descriptor of the wireless device. That is, the wireless device postpones power transmission until the difference in the battery level or the difference in the lifetime reaches the predetermined threshold.

At step 330, the wireless device determines that it is necessary to immediately share the energy between the wireless device and the neighboring device. At step 335, when the difference in the battery level or the difference in the lifetime is equal to or greater than the predetermined threshold, or when charging of one of the devices is started by a power supply, the wireless device determines a role of each of the devices as an energy supplier or an energy consumer. In other words, the wireless device determines the role of the wireless device, and a role of the neighboring device.

A role as an energy supplier or an energy consumer may be determined based on a designation of a user of the wireless device, the descriptor of the wireless device, and/or a predetermined rule. For example, the predetermined rule may indicate that a device connected to a power supply is to be determined as an energy supplier. In another example, the predetermined rule may indicate that when devices are operated on batteries, a device with a longest expected lifetime among the devices is to be determined as an energy supplier.

When a role of each device is determined, the wireless device determines an energy transmission scheme to share energy between an energy supplier and an energy consumer. At step 340, the wireless device determines whether at least two energy consumers exist among the at least one neighboring device. When at least two energy consumers exist, the wireless device performs step 345. Otherwise, the wireless device performs step 350.

At step 345 the wireless device determines the energy transmission scheme by assigning different frequencies or different time slots to the energy consumers. respectively. For example, the assigning may be performed by dividing a time for the energy consumers when sharing the same frequency. To assign resources such as time, frequencies, and/or the like, a round-robin based fair assignment scheme, an asymmetric assignment scheme based on a request of each wireless device, and/or the like may be used. The wireless device transmits the energy to the energy consumers based on the assigned frequencies or time slots.

At step 350, the wireless device determines whether at least two energy suppliers exist among the at least one neighboring device. When at least two energy suppliers exist, the wireless device performs step 355. Otherwise, the wireless device performs step 360.

The wireless device may independently transmit energy to each of the energy consumers by changing an energy transmission channel and energy transmission time, or may simultaneously transmit energy to the energy consumers using a cooperative scheme. Thus, it may be possible to improve a transmission efficiency. Accordingly, at step 355, the wireless device determines the energy transmission scheme so that the energy suppliers transmit energy independent or cooperatively. That is, the energy suppliers may change an energy transmission channel and energy transmission time, and may independently transmit the energy to each of the consumers. Alternatively, the energy suppliers may cooperate with each other, and may simultaneously transmit the energy to each of the consumers.

At step 360, the wireless device shares energy with the at least one neighboring device based on the energy transmission scheme. When energy sharing is started between the wireless device and the at least one neighboring device, and a preset condition is satisfied, energy transmission may be interrupted, and the wireless device may wait until a new condition to restart the energy sharing is satisfied. In an example, when the difference in the battery level or the different in the lifetime drops below the predetermined threshold, the wireless device may wait until the new condition to restart the energy sharing is satisfied, by repeatedly performing steps 305 through 325, or steps 310 through 325, until the difference in the battery level or the different in the lifetime corresponds to the predetermined threshold.

In another example, when a new neighboring device is added in the energy sharing environment, when a neighboring device moves further than a predetermined distance from the wireless device (e.g., out of the energy sharing environment), or when a power source is changed, the wireless device may wait until the new condition to restart energy sharing is satisfied, by repeatedly performing steps 305 through 325, or steps 310 through 325. In still another example, when a neighboring device with a new power supply enters the energy sharing environment due to movement of a user and/or the like, while the wireless device with an active power supply supplies power as an energy supplier, the wireless device may detect the new neighboring device. The new neighboring device may be detected using a predetermined method, for example, a change in a resonance, messages exchanged using a separate circuit, and/or the like. In this example, a role of each of the devices may be maintained as an energy supplier or an energy consumer, or may be changed, by changing a used channel or a transmission time.

Figure 4:
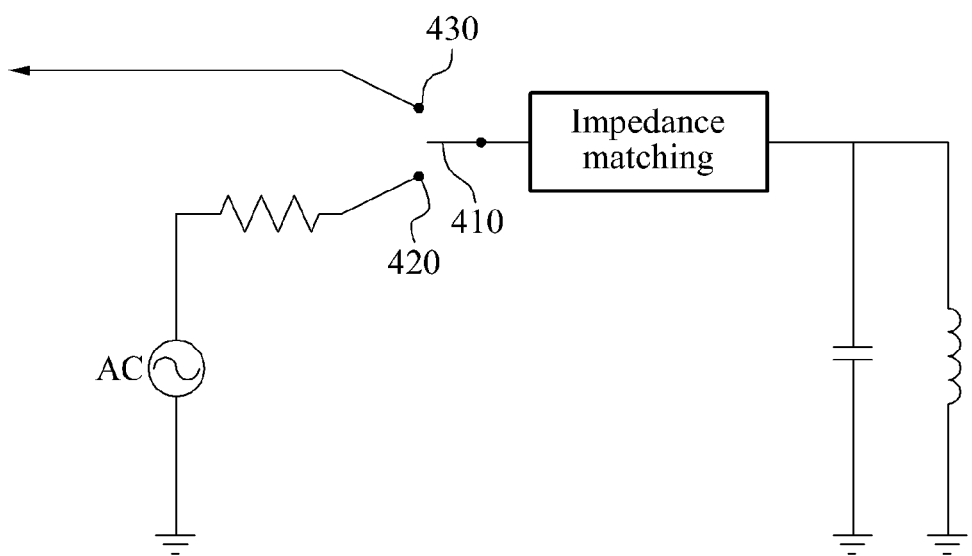
FIG. 4 is a diagram illustrating an example of a module configured to transmit or receive energy using a resonance coupling scheme in a wireless device.

FIG. 4 illustrates an example of a module configured to transmit or receive energy using a resonance coupling scheme in a wireless device. The wireless device includes the module configured to wirelessly transmit power using the resonance coupling scheme. The wireless device transmits or receives energy, depending on which circuit is connected to a switch 410 in the module. In an example in which the switch 410 is connected to a circuit 420, the wireless device transmits power to at least one neighboring device, so that energy is supplied. In other words, the wireless device functions as an energy supplier.

In another example in which the switch 410 is connected to a circuit 430, the wireless device receives power from the neighboring device. In other words, the wireless device functions as an energy consumer. The wireless device uses the resonance coupling scheme to separately configure (e.g., perform impedance matching for) a transmitter and a receiver.

Figure 5:
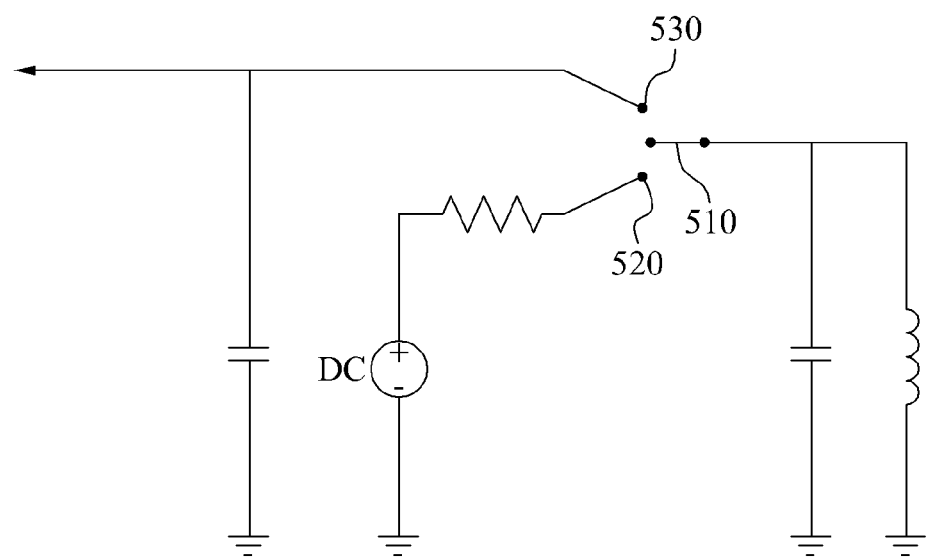
FIG. 5 is a diagram illustrating an example of a module configured to transmit or receive energy using a resonator isolation scheme in a wireless device.

FIG. 5 illustrates an example of a module configured to transmit or receive energy using a resonator isolation scheme in a wireless device. The wireless device includes the module configured to wirelessly transmit power using the resonator isolation scheme. The wireless device transmits or receives energy, depending on which circuit is connected to a switch 510 in the module. In an example in which the switch 510 is connected to a circuit 520, the wireless device transmits power to at least one neighboring device, so that energy may be supplied. In other words, the wireless device functions as an energy supplier.

In another example in which the switch 510 is connected to a circuit 530, the wireless device receives power from the neighboring device. In other words, the wireless device functions as an energy consumer. The wireless device uses the resonator isolation scheme to separately configure a transmitter and a receiver.

Figure 6:
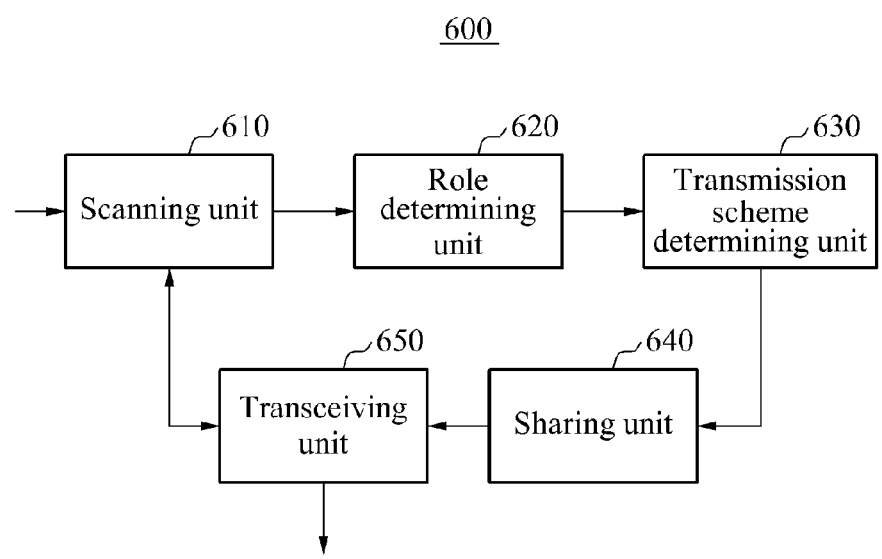
FIG. 6 is a block diagram illustrating an example of an energy sharing apparatus of a wireless device.

FIG. 6 illustrates an example of an energy sharing apparatus 600 of a wireless device. The energy sharing apparatus 600 includes a scanning unit 610, a role determining unit 620, a transmission scheme determining unit 630, a sharing unit 640, and a transceiving unit 650.

The scanning unit 610 scans at least one neighboring device. The neighboring device is configured to wirelessly share data or energy with the wireless device, as described above.

The role determining unit 620 determines a role of the wireless device, as either an energy supplier or an energy consumer, between the wireless device and the neighboring device. The transmission scheme determining unit 630 determines an energy transmission scheme to share energy between the energy supplier and the energy consumer.

The transceiving unit 650 transmits and/or receives data and/or energy to and/or from the neighboring device. The sharing unit 640 shares energy with the neighboring device based on the energy transmission scheme. The examples described herein with reference to FIGS. 2 and 3 may be applied to the example illustrated in FIG. 6.

Figure 7:
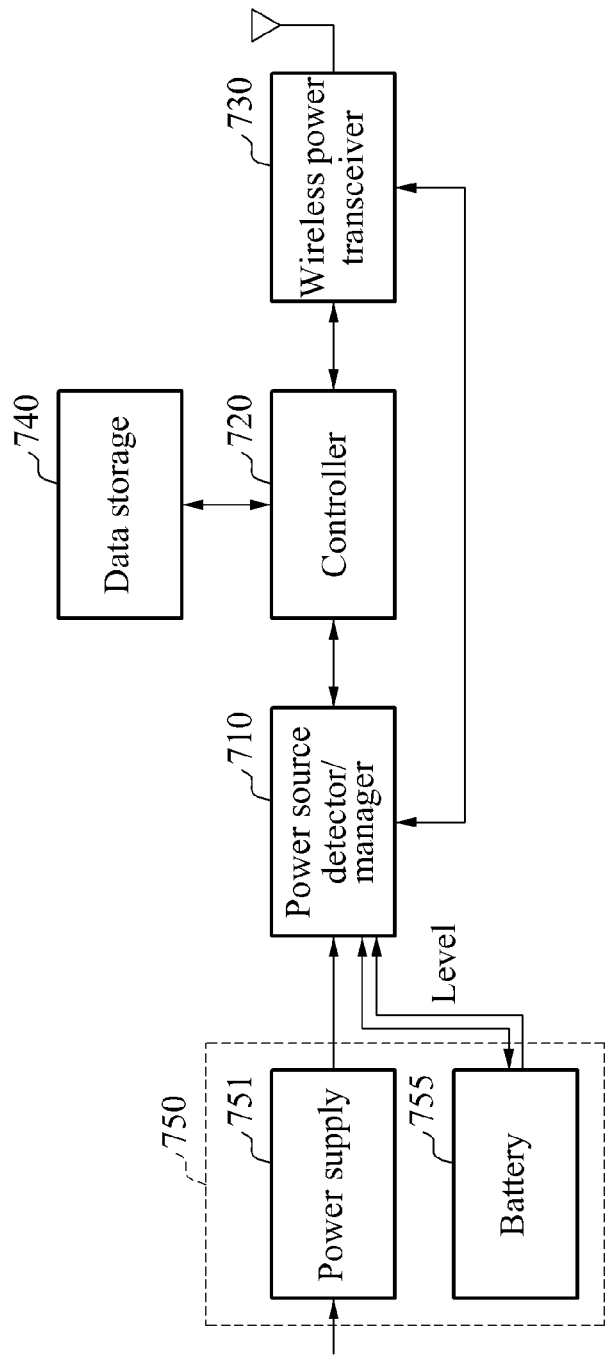
FIG. 7 is a block diagram illustrating an example of a wireless device including an energy sharing apparatus.

FIG. 7 illustrates an example of a wireless device 700 including an energy sharing apparatus. The wireless device 700 includes a power source detector and manager (power source detector/manager) 710, a controller 720, a wireless power transceiver 730, a data storage 740, and a power source unit 750.

The power source detector/manager 710 selects a power source for the wireless device 700, and/or monitors a level of a battery 755 in the power source unit 750. The controller 720 determines whether to transmit and/or receive power to and/or from at least one neighboring device, and controls an operation of transmitting and/or receiving of power. For example, the controller 720 predicts power consumption of the wireless device 700, manages the neighboring device, and determines whether to transmit and/or receive power between the wireless device 700 and the neighboring device, if necessary. Additionally, the controller 720 analyzes a state of a peripheral device through scanning, predicts a lifetime of the peripheral device, and transmits information regarding a lifetime of the wireless device 700, and/or information used to determine roles of devices. Subsequently, the controller 720 determines a role of the wireless device 700 and a role of the peripheral device, and performs a control operation to actually transmit and/or receive power between the wireless device 700 and the peripheral device.

The wireless power transceiver 730 wirelessly transmits and/or receives power, so that energy is shared between the wireless device 700 and the neighboring device or the peripheral device. Additionally, the wireless power transceiver 730 transmits and/or receives data that is used to control and manage the wireless device 700.

The above-described elements of the energy sharing apparatus 600 of FIG. 6 may be appropriately included in the power source detector/manager 710, the controller 720, and/or the like, and may perform their corresponding functions. Additionally, the transceiving unit 650 of FIG. 6 may function as the wireless power transceiving unit 730.

The data storage 740 records data, and/or stores information, such as, for example, performance of a battery. The data is collected to determine whether to transmit and/or receive power in a device, e.g., the wireless device 700.

The power source unit 750 functions to supply a power source to a device, e.g., the wireless device 700. The power source unit 750 includes a power supply 751 and the battery 755. The power supply 751 supplies power stably via a plug and/or the like.

Figure 8:
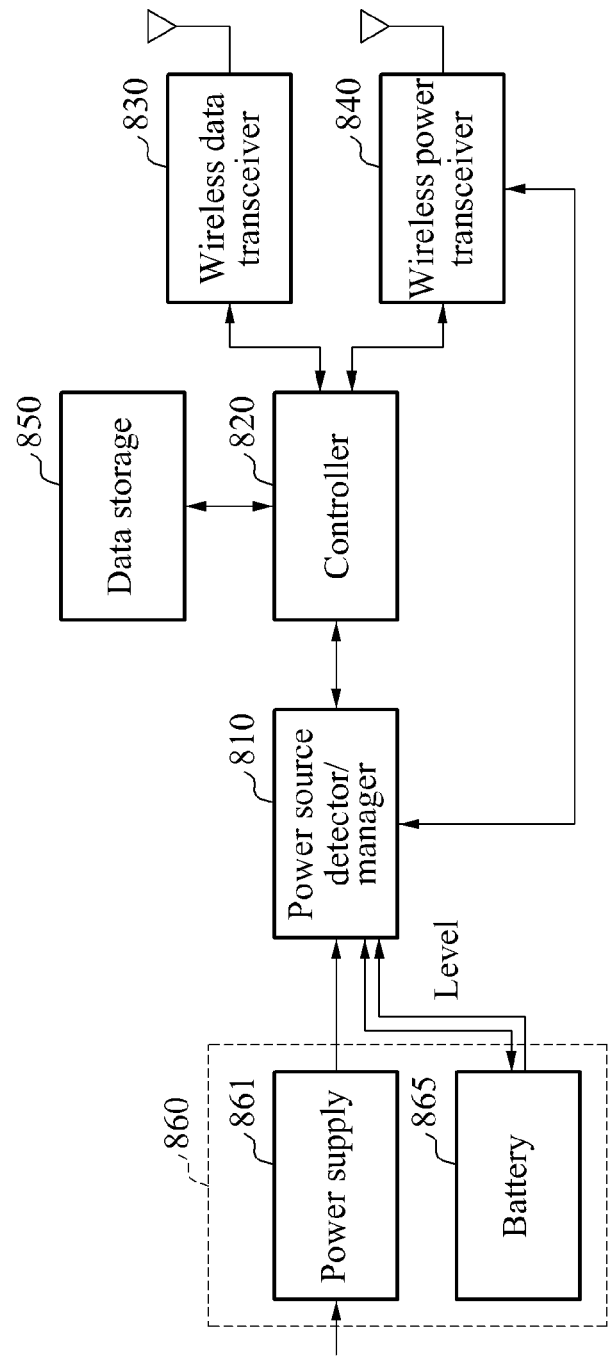
FIG. 8 is a block diagram illustrating an example in which a wireless module configured to transmit and receive data used to determine whether to transmit and receive power, is added to a wireless device including an energy sharing apparatus.

FIG. 8 illustrates an example in which a separate wireless module configured to transmit and receive data used to determine whether to transmit and receive power, is added to a wireless device 800 including an energy sharing apparatus. In more detail, the wireless device 800 is configured by dividing the wireless power transceiver 730 of FIG. 7 into a wireless data transceiver 830 and a wireless power transceiver 840. The wireless data transceiver 830 transmits and/or receives, to and/or from other wireless devices, data used to determine whether to transmit and/or receive power, namely, energy, between the wireless device 800 and the other wireless devices.

A power source detector/manager 810, a controller 820, a data storage 850, a power source unit 860, a power supply 861, and a battery 865 of FIG. 8 may perform the same operations as those of the power source detector/manager 710, the controller 720, the data storage 740, the power source unit 750, the power supply 751, and the battery 755 of FIG. 7, respectively. Accordingly, the example described herein with reference to FIG. 7 may be applied to the example illustrated in FIG. 8.

Figure 9:
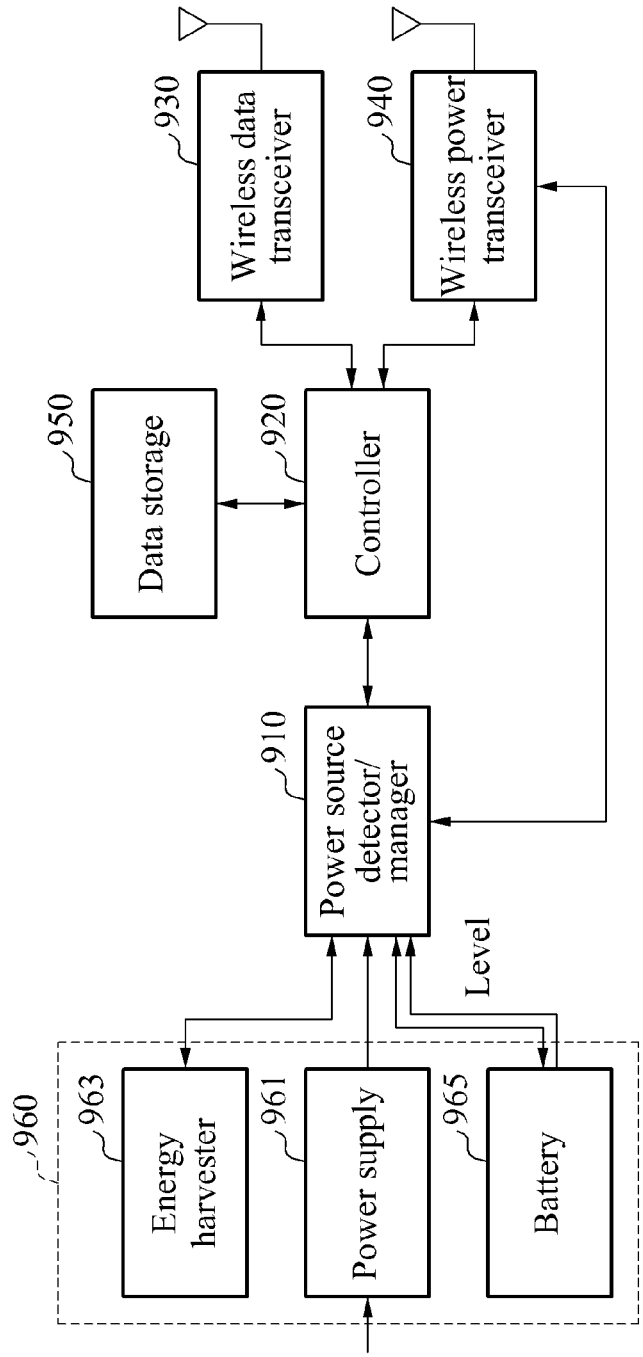
FIG. 9 is a block diagram illustrating an example in which an energy harvester is added to a power source unit in a wireless device including an energy sharing apparatus.

FIG. 9 illustrates an example in which an energy harvester 963 is added to a power source unit 960 in a wireless device 900 including an energy sharing apparatus. The energy harvester 963 harvests energy, using, for example, a solar heat, a vibration, a temperature difference, and/or the like, and generates energy, namely, power. The generated energy, namely, power is supplied to the wireless device 900 or at least one neighboring device.

A power source detector/manager 910, a controller 920, a wireless data transceiver 930, a wireless power transceiver 940, a data storage 950, a power supply 961, and a battery 965 of FIG. 9 may perform the same operations as those of the power source detector/manager 710, the controller 720, the wireless data transceiver 830, the wireless power transceiver 730, the data storage 740, the power supply 751, and the battery 755 of FIGS. 7 and 8, respectively. Accordingly the example described herein with reference to FIGS. 7 and 8 may be applied to the example illustrated in FIG. 9.

Figure 10:
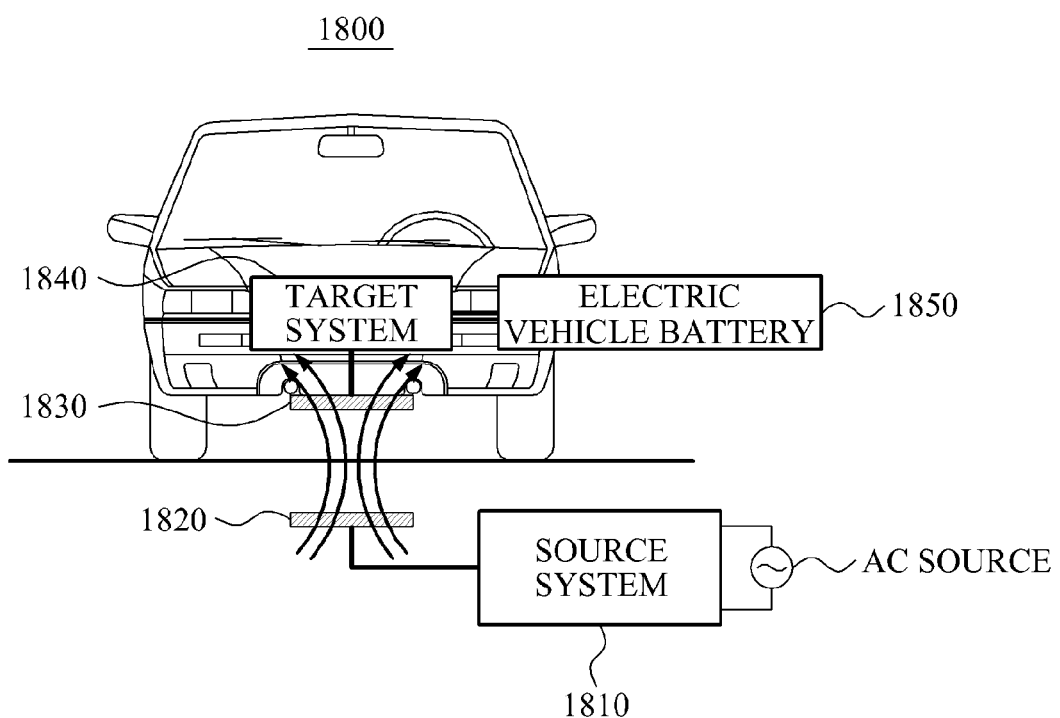
FIG. 10 is a diagram illustrating an example of an electric vehicle charging system.

FIG. 10 illustrates an electric vehicle charging system. Referring to FIG. 10, an electric vehicle charging system 1800 includes a source system 1810, a source resonator 1820, a target resonator 1830, a target system 1840, and an electric vehicle battery 1850.

The source system 1810 and the source resonator 1820 in the electric vehicle charging system 1800 may function as a source. Additionally, the target resonator 1830 and the target system 1840 in the electric vehicle charging system 1800 may function as a target.

The source system 1810 may include an alternating current-to-direct current (AC/DC) converter, a power detector, a power converter, and a control/communication unit. The target system 1840 may include a rectification unit, a DC-to-DC (DC/DC) converter, a switch unit, a charging unit, and a control/communication unit. The electric vehicle battery 1850 may be charged by the target system 1840. The electric vehicle charging system 1800 may use a resonant frequency in a band of a few kilohertz (KHz) to tens of MHz.

The source system 1810 may generate power, based on a type of charging vehicle, a capacity of a battery, and a charging state of a battery, and may supply the generated power to the target system 1840. The source system 1810 may control the source resonator 1820 and the target resonator 1830 to be aligned. For example, when the source resonator 1820 and the target resonator 1830 are not aligned, the controller of the source system 1810 may transmit a message to the target system 1840, and may control alignment between the source resonator 1820 and the target resonator 1830.

For example, when the target resonator 1830 is not located in a position enabling maximum magnetic resonance, the source resonator 1820 and the target resonator 1830 may not be aligned. When a vehicle does not stop accurately, the source system 1810 may induce a position of the vehicle to be adjusted, and may control the source resonator 1820 and the target resonator 1830 to be aligned. The source system 1810 and the target system 1840 may transmit or receive an ID of a vehicle, or may exchange various messages, through communication.

The descriptions of FIGS. 2 through 9 may be applied to the electric vehicle charging system 1800. However, the electric vehicle charging system 1800 may use a resonant frequency in a band of a few KHz to tens of MHz, and may transmit power that is equal to or higher than tens of watts to charge the electric vehicle battery 1850.

Figure 11:
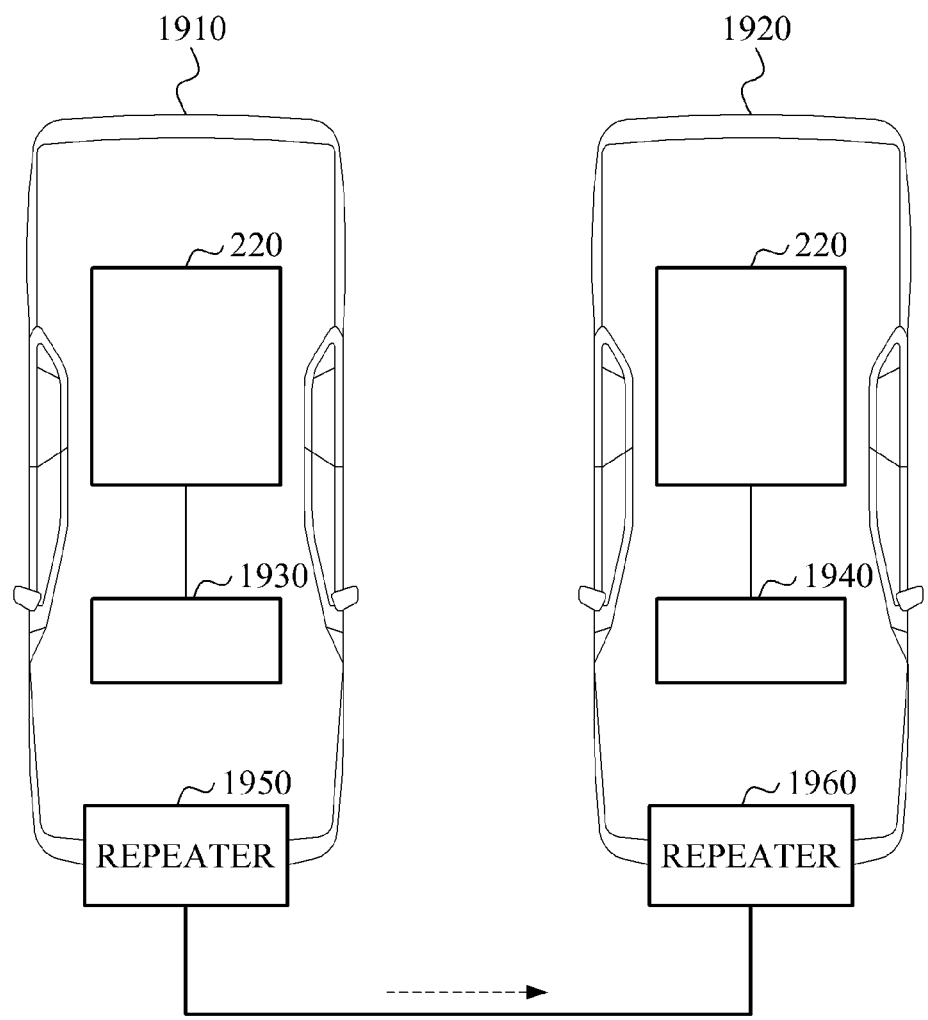
FIG. 11 is a diagram illustrating an example of a wireless power transmission method of an electric vehicle.

FIG. 11 illustrates an example of a wireless power transmission method of an electric vehicle. In FIG. 11, wireless power transmission may be performed between electric vehicles.

A first electric vehicle 1910 may be operated in a power transmission mode, and a second electric vehicle 1920 may be operated in a power reception mode. The first electric vehicle 1910 may further include a source resonator 1930 operated in the power transmission mode, and the second electric vehicle 1920 may further include a target resonator 1940 operated in the power reception mode.

Additionally, the wireless power transmission between the first electric vehicle 1910 and the second electric vehicle 1920 may be performed via repeaters 1950 and 1960. The first electric vehicle 1910 may perform the wireless power transmission using an external power source, or using power used to charge a battery.

According to the teachings above, there is provided a method and apparatus in which energy may be shared, and thus, it may be possible to maximize a service time of an application, and/or a lifetime of a wireless device operated using at least one battery. Additionally, energy may be shared between different wireless devices that enable energy sharing, and thus, it may be possible to maximize an execution time of a predetermined application of a predetermined device.

Furthermore, since energy may be shared between different wireless devices that enable energy sharing, it may be possible to support a service of a predetermined wireless device by transmitting a minimum amount of energy, despite a lack of power of the predetermined wireless device. Moreover, it may be possible to define a unit of an energy transmission amount to transmit and/or receive energy between different wireless devices that enable energy sharing, and it may be possible to support a service of renting, selling and buying energy between devices possessed by different users.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power sharing method for a wireless device, sharing power between the wireless device and at least one neighboring wireless device, the method comprising:
   scanning, by the wireless device, the at least one neighboring wireless device;
   monitoring the at least one neighboring wireless device to determine whether to share the power with the at least one neighboring wireless device;
   determining roles of the wireless device and the at least one neighboring wireless device, respectively as either a power supplier or a power consumer;
   determining a power sharing scheme and selectively sharing power between the wireless device and the at least one neighboring wireless device based on the determined roles and the determined power sharing scheme, including the wireless device receiving power when in the power consumer role from the at least one neighboring wireless device that is in the power supplier role;
   receiving, from the at least one neighboring wireless device, a descriptor of the at least one neighboring wireless device; and
   generating a neighbor table based on the descriptor of the at least one neighboring wireless device,
   wherein the generating of the neighbor table comprises:
      adding, to the neighbor table, information on a strength of a signal received from the at least one neighboring wireless device, and information on an amount of time elapsed after the descriptor of the at least one neighboring wireless device is received; and
      adding, to the neighbor table and based on a descriptor received from another neighboring wireless device, information on a strength of a signal received from the other neighboring wireless device, and information on an amount of time elapsed after the descriptor of the other neighboring wireless device is received.

2. The power sharing method of claim 1, wherein the descriptor of the at least one neighboring wireless device comprises an identification (ID) of the respective neighboring wireless device, or information associated with a battery of the respective neighboring wireless device, or a priority level of the respective neighboring wireless device, or information regarding whether the respective neighboring wireless device is capable of transmitting and/or receiving power, or a role of the respective neighboring wireless device, or a cooperativeness of the respective neighboring wireless device, or any combination thereof.

3. The power sharing method of claim 1, further comprising:
   determining whether it is necessary to immediately share power between the wireless device and the at least one neighboring wireless device.

4. The power sharing method of claim 3, wherein the determining whether it is necessary to immediately share power comprises:
   checking a battery level and an operation time expected based on a currently-used battery capacity of each of the wireless device and the at least one neighboring wireless device, the battery level and the operation time expected based on a currently-used battery capacity of the wireless device being included in a descriptor of the wireless device, and the battery level and the operation time expected based on the currently-used battery capacity of the at least one neighboring wireless device being included in the descriptor of the at least one neighboring wireless device;
   computing a difference in the battery level or a difference in operation time expected based on the currently-used battery capacity between the wireless device and the at least one neighboring wireless device based on a result of the checking; and
   determining whether it is necessary to immediately share the power between the wireless device and the at least one neighboring wireless device based on whether the difference in the battery level, or the difference in the operation time expected based on a currently-used battery capacity, corresponds to a predetermined threshold.

5. The power sharing method of claim 1, further comprising:
   generating the descriptor of the wireless device,
   wherein the descriptor of the wireless device comprises an ID of the wireless device, or information associated with a battery of the wireless device, or a priority level of the wireless device, or information regarding whether the wireless device is capable of transmitting and/or receiving power, or the role of the wireless device, of a cooperativeness of the wireless device, or any combination thereof.

6. The power sharing method of claim 1, wherein the determining of the role of the wireless device is based on a designation by a user of the wireless device, or the descriptor of the wireless device, or the predetermined rule, or any combination thereof.

7. The power sharing method of claim 6, wherein the predetermined rule determines, as the power supplier, a device with a longest operation time expected based on a currently-used battery capacity, and/or a device connected to a power supply, among the wireless device and the at least one neighboring wireless device.

8. The power sharing method of claim 6, further comprising:
changing the role of the wireless device.

9. The power sharing method of claim 8, wherein the changing comprises changing the role of the wireless device based on the designation by the user of the wireless device, and/or the descriptor of the at least one neighboring wireless device that is received from the at least one neighboring wireless device.

10. The power sharing method of claim 1, wherein the sharing of the power comprises adjusting a strength of a signal transmitted by the wireless device, or a time required to transmit the signal, or a value used to perform impedance matching between the wireless device and the at least one neighboring wireless device, or any combination thereof.

11. The power sharing method of claim 1, further comprising:
determining whether a preset condition to interrupt the sharing of the power occurs while the power is shared with the at least one neighboring wireless device.

12. The power sharing method of claim 11, wherein the preset condition occurs when a difference in a battery level, or a difference in an operation time expected based on a currently-used battery capacity, between the wireless device and the at least one neighboring wireless device is less than a predetermined threshold.

13. The power sharing method of claim 1, further comprising:
determining whether a number of the at least one neighboring wireless device is changed.

14. The power sharing method of claim 1, wherein the determining to share the power comprises determining whether to share the power with the at least one neighboring wireless device based on a designation by a user of the wireless device, and/or an alarm based on a change in a descriptor of the wireless device.

15. A non-transitory computer-readable recording medium storing a program comprising instructions to cause a computer to implement the power sharing method of claim 1.

16. A power sharing apparatus of a wireless device, comprising:
a scanning unit configured to scan at least one neighboring wireless device;
a determining unit configured to perform the method of claim 1.

17. The power sharing method of claim 1, wherein the selectively sharing of power between the wireless device and the at least one neighboring wireless devices based on the determined roles includes the wireless device transmitting power when in the power supplier role to the at least two neighboring wireless devices that are in the power receiving roles.

18. The power sharing method of claim 1, wherein the selectively sharing of power comprises waiting to share power until when a power transmission is determined to be required.

19. The power sharing method of claim 1, wherein each of the respective descriptors includes a Received Signal Strength Indication, a battery level, an amount of time the battery level will power the device, a priority level, and a current role.

20. The power sharing method of claim 19, further comprising determining, based on the respective descriptors, whether a preset condition to interrupt the sharing of the power occurs during the sharing of the power.

21. A power sharing method for a wireless device, sharing power between the wireless device and at least one neighboring wireless device, the method comprising:
scanning, by the wireless device, the at least one neighboring wireless device;
determining whether to share the power with the at least one neighboring wireless device based on a change in a descriptor of the wireless device;
determining roles of the wireless device and the at least one neighboring wireless device, respectively as either a power supplier or a power consumer;
determining a power transmission scheme to share power between the wireless device and the at least one neighboring wireless device;
selectively sharing power between the wireless device and the at least one neighboring wireless device based on the determined roles and the power transmission scheme, including the wireless device receiving power when in the power consumer role from the at least one neighboring wireless device that is in the power supplier role,
receiving, from the at least one neighboring wireless device, a descriptor of the at least one neighboring wireless device; and
generating a neighbor table based on the descriptor of the at least one neighboring wireless device,
wherein the determining of the power transmission scheme comprises:
determining the power transmission scheme so that, when the at least one neighboring wireless device comprises at least two neighboring wireless devices, each of the at least two neighboring wireless devices that are in the power supplier roles utilize respective power transmission channels and power transmission times, and alternately transmit power, and
wherein the generating of the neighbor table comprises:
adding, to the neighbor table, information on a strength of a signal received from the at least one neighboring wireless device, and information on an amount of time elapsed after the descriptor of the at least one neighboring wireless device is received; and
adding, to the neighbor table and based on a descriptor received from another neighboring wireless device, information on a strength of a signal received from the other neighboring wireless device, and information on an amount of time elapsed after the descriptor of the other neighboring wireless device is received.

22. The power sharing method of claim 21, wherein the determining of the power transmission scheme further comprises:
determining the power transmission scheme so that each of the at least two neighboring wireless devices that are in the power supplier roles utilize respective power transmission channels and power transmission times, and alternately transmit power, or so that the at least two neighboring wireless devices cooperate with each other and simultaneously transmit the power.

23. A power sharing method for a wireless device, sharing power between the wireless device and at least one neighboring wireless device, the method comprising:
  scanning, by the wireless device, the at least one neighboring wireless device;
  determining whether to share the power with the at least one neighboring wireless device based on a change in a descriptor of the wireless device;
  determining roles of the wireless device and the at least one neighboring wireless device, respectively as either a power supplier or a power consumer;
  determining a power transmission scheme to share power between the wireless device and the at least one neighboring wireless device;
  selectively sharing power between the wireless device and the at least one neighboring wireless device based on the determined roles and the power transmission scheme, including the wireless device receiving power when in the power consumer role from the at least one neighboring wireless device that is in the power supplier role;
  receiving, from the at least one neighboring wireless device, a descriptor of the at least one neighboring wireless device; and
  generating a neighbor table based on the descriptor of the at least one neighboring wireless device,
  wherein the determining of the power transmission scheme comprises:
    determining whether at least two power consumers exist among the at least one neighboring wireless device and the wireless device; and
    determining the power transmission scheme so that power is transmitted by assigning different frequencies or different time slots to each of the at least two power consumers, and wherein the generating of the neighbor table comprises:
  adding, to the neighbor table, information on a strength of a signal received from the at least one neighboring wireless device, and information on an amount of time elapsed after the descriptor of the at least one neighboring wireless device is received; and
  adding, to the neighbor table and based on a descriptor received from another neighboring wireless device, information on a strength of a signal received from the other neighboring wireless device, and information on an amount of time elapsed after the descriptor of the other neighboring wireless device is received.

* * * * *